(12) United States Patent
Greenwood et al.

(10) Patent No.: US 6,433,833 B1
(45) Date of Patent: Aug. 13, 2002

(54) SYSTEM FOR EFFICIENTLY GENERATING A VARIETY OF SOLID SIGNALS AND KEY SIGNALS

(75) Inventors: Jonathan Mark Greenwood; James Hendrie McIntyre, both of Basingstoke; Andrew Garrett, Stroud, all of (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/545,200

(22) Filed: Apr. 6, 2000

(30) Foreign Application Priority Data

Apr. 9, 1999 (GB) ................................................ 9908244

(51) Int. Cl.[7] ........................... H04N 9/74; H04N 5/268
(52) U.S. Cl. ..................... 348/584; 348/590; 348/598; 348/705
(58) Field of Search ................................ 348/705, 584, 348/585, 590, 591, 593, 594, 598; H04N 9/74, 9/76, 5/268

(56) References Cited

U.S. PATENT DOCUMENTS 4,873,568 A  * 10/1989  Jackson et al. ............. 348/591
5,608,465 A     3/1997  Lake ........................... 348/584

* cited by examiner

Primary Examiner—Sherrie Hsia
(74) Attorney, Agent, or Firm—Frommer Lawrence & Haug LLP; William S. Frommer; Bruno Polito

(57) ABSTRACT

A system for generating a variety of solid signals and key signals. The system includes a multiple of solid generators, a multiple of key signal generators and a cross-point switch. Each of the solid generators includes a multiple of solid mixers, and each of the key signal generators includes a multiple of key signal mixers. The cross-point switch is arranged to connect any of the solid generators and key signal generators to any of the switch's main outputs, and to connect any of the solid generators to any of the key generators. The system provides for selection of preset delays to compensate for different signal routings. A timing control controls routing and delay selection.

17 Claims, 12 Drawing Sheets

A

B

C

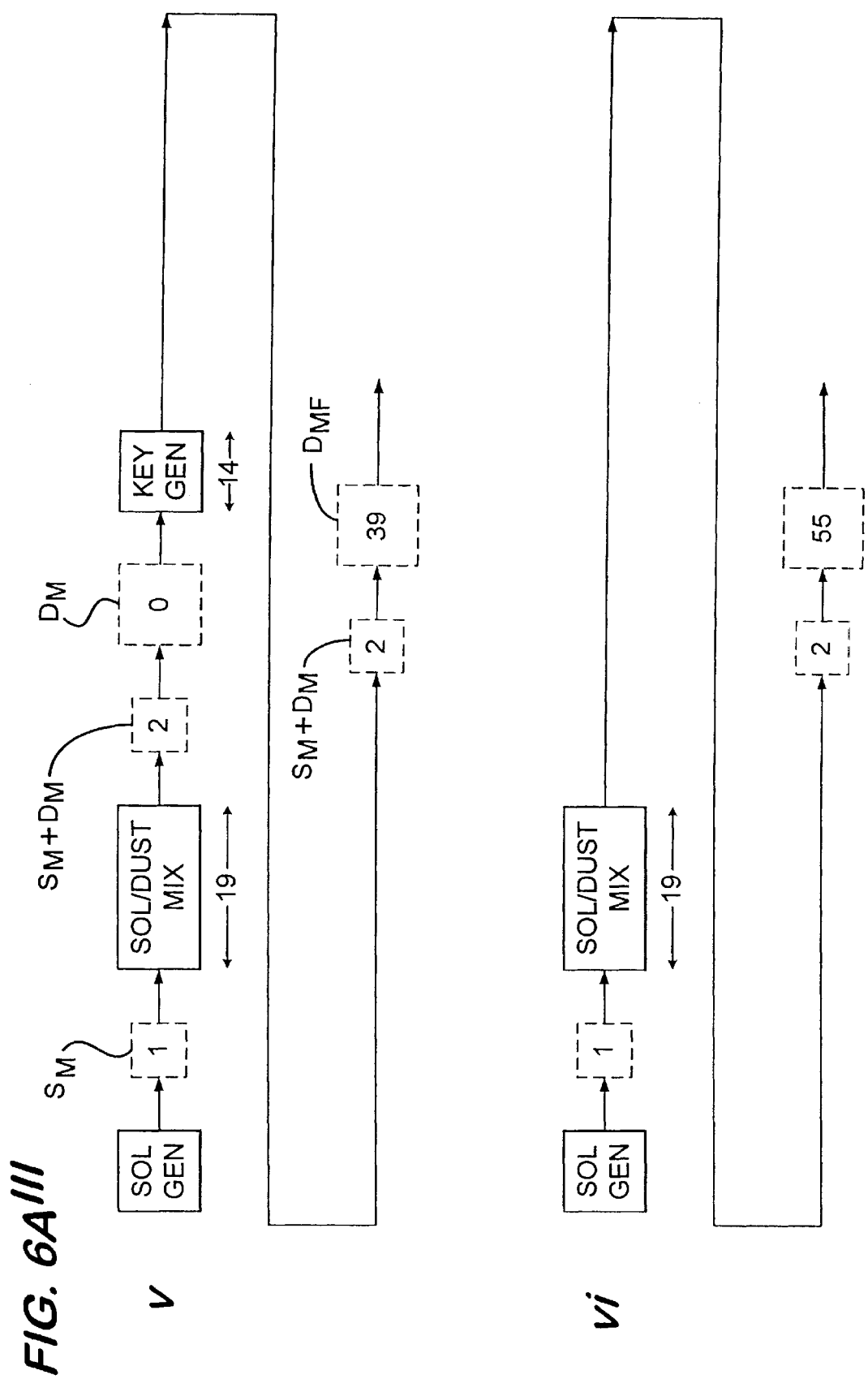
FIG. 6AIII

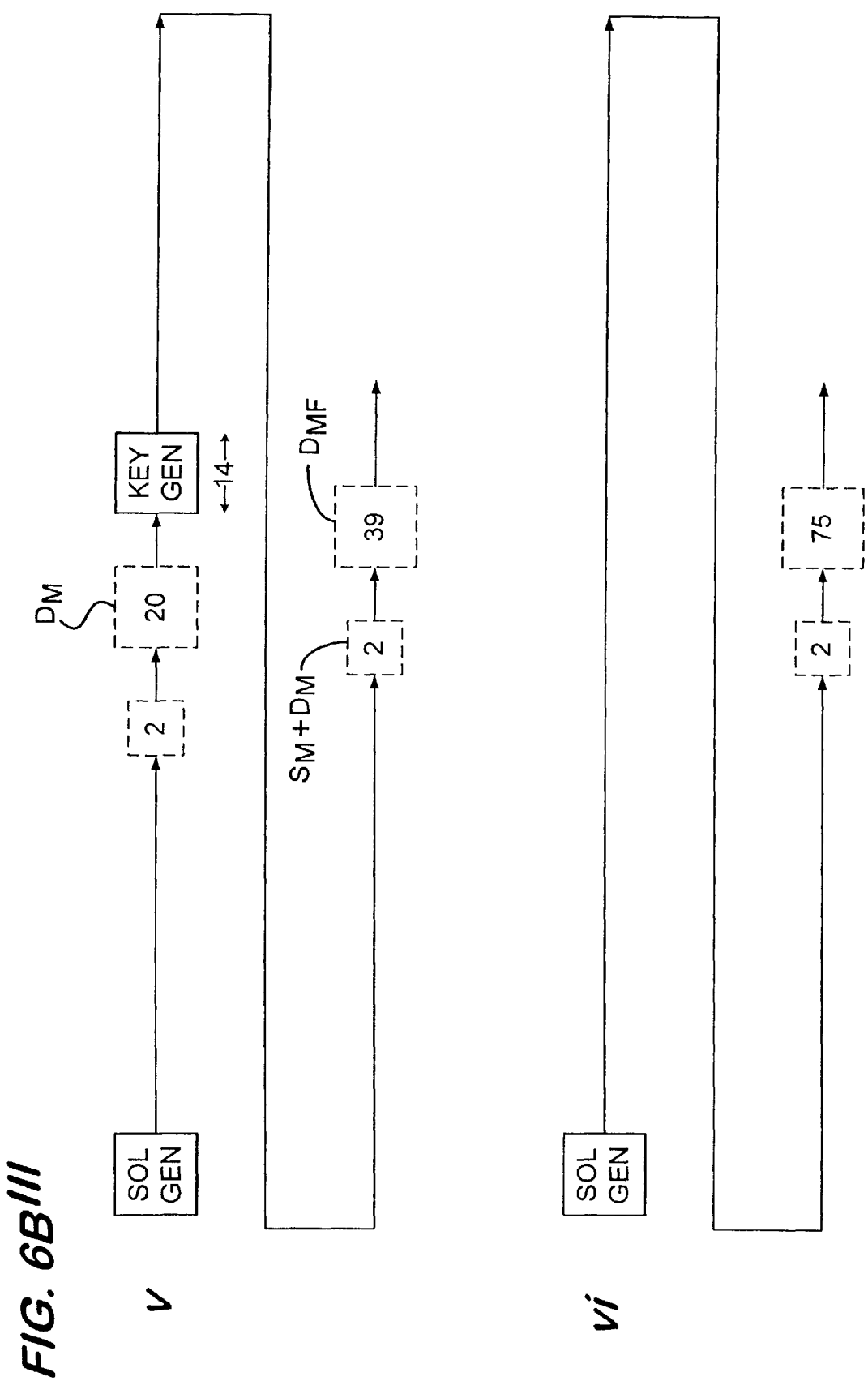
FIG. 6B III

SYSTEM FOR EFFICIENTLY GENERATING A VARIETY OF SOLID SIGNALS AND KEY SIGNALS

BACKGROUND OF THE INVENTION

1. Field of the Invention

Annexes A to F are attached to this specification and the whole content of each Annex is incorporated into this specification.

The present invention relates to a system for generating solid signals and key signals. A solid signal is an electrical signal representing a three dimensional surface of a desired shape. A solid signal is also referred to herein as a 'solid'. It may comprise at least one ramp signal and typically comprises a combination of at least two ramp signals which themselves may be modified. It may comprise a signal defined by a polar coordinate system representing a body of revolution such as a circular cone.

2. Description of the Prior Art

Reference will now be made to FIGS. 1 to 3 of the accompanying drawings which show background to the present invention.

FIG. 1 illustrates a known simple wipe between two video sources X and Y.

As the wipe proceeds as indicated by arrow W, video X is replaced across the display by video Y (or vice versa). The effect of a wipe is achieved by mixing the video sources X and Y according to $$KX+(1-K)Y$$

where K is a keying signal. The keying signal K is derived from a 'solid'. This will be explained with reference to FIGS. 2 and 3 i.e. a function having a value depending on the h and v co-ordinates within the picture, where v represents line number and h represents pixel position along a line.

FIG. 2a illustrates a known example of a 'solid' which is a simple ramp. As shown in FIG. 2, a clip level CP is defined. It will be appreciated that over a field or frame, the clip level defines a plane referred to herein as the clip plane. The keying signal K is, in known manner, derived from the solid by applying high gain to the solid and limiting the result, as shown in FIG. 2B. The keying signal has two levels 0 and 1. The transition between the levels occurs where the solid intersects the clip plane CP. The position of intersection is varied, to produce the wipe, by adding an offset to the solid.

FIG. 3 is a schematic block diagram of a wipe generator of a vision mixer comprising a solid generator, a clip element, a gain element, a limiter and a mixer which mixes video sources X and Y in dependence upon the keying signal K.

The solid generator produces a solid, for example a ramp as shown in FIG. 2A. The clip element applies an offset to the ramp to vary the intersection of the ramp with the clip plane CP as shown in FIGS. 2A to 2C. Gain is applied to the offset ramp, in the gain element and the result limited in the limiter to produce the signal K. The amount of gain applied may be varied as shown in FIG. 2B: that varies the slope of the transition between the limit values of the keying signal K.

The mixer mixes the video sources X and Y according to $$KX+(1-K)Y.$$

If K=1, the output is X, if K=0 the output is Y.

If the gain applied to the solid is unity and the clip offset is zero, the solid and the keying signal are identical.

It is desired to provide a system which allows the production of a large variety of wipe patterns. It is also desired to allow the production of new wipe patterns.

SUMMARY OF THE INVENTION

According to the present invention, there is provided a system for generating solids and key signals comprising:

n solid generators, where n is equal to or greater than 2;

m key signal generator, where m is equal to or greater than 2;

a cross-point switch having first inputs connected to respective ones of the solid generators, to receive solids, second inputs connected to respective ones of the key generators to receive key signals, first outputs connected to respective ones of the key generators for supplying solids to the key generators, at least one second output; and control means for controlling the cross-point switch;

the control means and cross-point switch being arranged to:

connect any of the first inputs to any of the first and second outputs; and connect any of the second inputs to the, or any, second output.

The combination of a cross-point switch with plural solid generators and plural key generators provides a flexible system which allows a large variety of solids and key signals to be produced.

The solid generators connected to the first inputs preferably include any two or more of: plural ramp generators; a polar converter which converts linear ramp signals to polar form for the generation of curved surfaces; a karaoke generator (which is inventive per se) and which generates a solid allowing the production of wipe patterns in the form of bands which progress across a frame; a random generator for generating solids of random dimensions. Other solid generators may be provided. In addition at least one first input is provided for connection to a solid generator external to the system.

An embodiment of the cross point switch has third at least one third inputs and at least a pair of third outputs. Mixing means are coupled to the third outputs to receive solids therefrom and to mix the solids. The mixed solids are coupled to the third input. A mixing means may be coupled to a first pair of third outputs for mixing solids.

A mixing means maybe coupled to a pair of key generators for mixing keys.

A mixing means may be coupled to the output of another mixing means for mixing the output thereof with another solid, for example a solid in the form of random noise.

A recursive mixer may be provided for recursively mixing solids or keys.

Signal processing circuits such as key generators, and mixing means and the recursive mixer, may be arranged to selectively mix and to pass signals unmixed in the case of mixers or to selectively convert solids to keys and to pass solids unconverted in the case of key generators. This allows such circuits to be connected in series to outputs of the cross point switch reducing the number of outputs needed. This also provides flexibility in the processing of keys and solids again increasing the number of solids and wipe patterns which can be produced.

The combination of the cross point switch, the solid generators, the key generators preferably together with mixing means which may be connected in series with key generators and other mixers, provides a potentially very large number of signal paths or routes through the system. Delay means are provided to compensate for the relative delays of different routes. The delay means are controlled by control means which select the routes and thus the delays associated with the routes.

In a preferred embodiment of the invention, the control means provides a fixed set of predetermined routes, and thus a fixed set of delays. Most preferably delays are provided with the routes such that all signals experience the same overall delay from first input to final output regardless of the route taken.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 4:
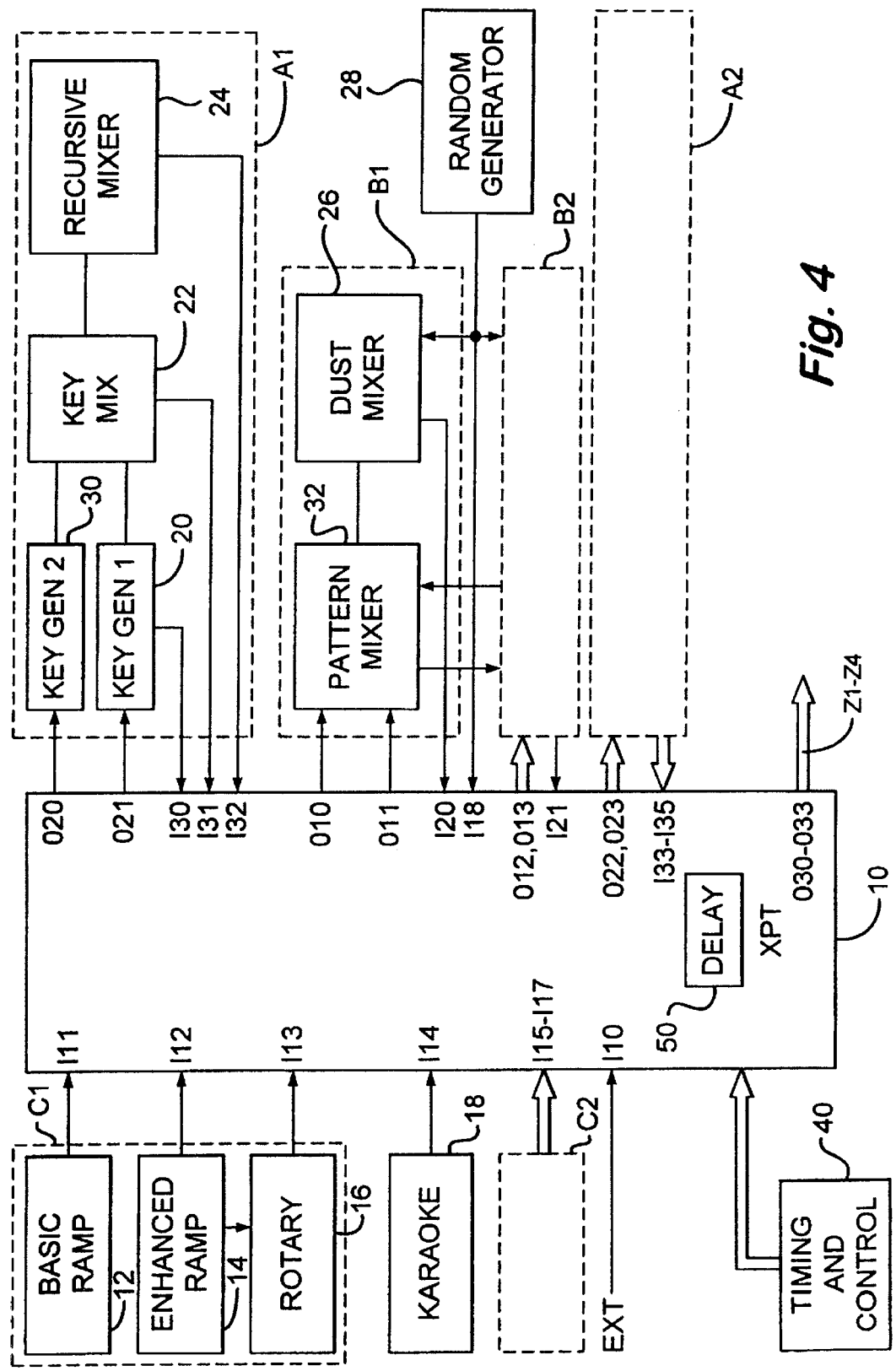
FIG. 4 is a schematic block diagram of an example of a generator according to the present invention, for producing solids and key signals.

FIG. 4 shows an example of a system according to the invention for generating solids and key signals.

A cross-point switch 10 has:
a) 17 inputs I10 to I18, I20 to I21 and I30 to I35; and
b) 12 outputs O10 to O13, O20, O21, O22, O23 and O30 to O33.

The cross-point switch comprises hardware which in principle allows any of outputs to be connected to any of the inputs. However, in practice some restrictions are applied to the connections as will be explained.

Inputs

The inputs are arranged as follows.

Figure 1:
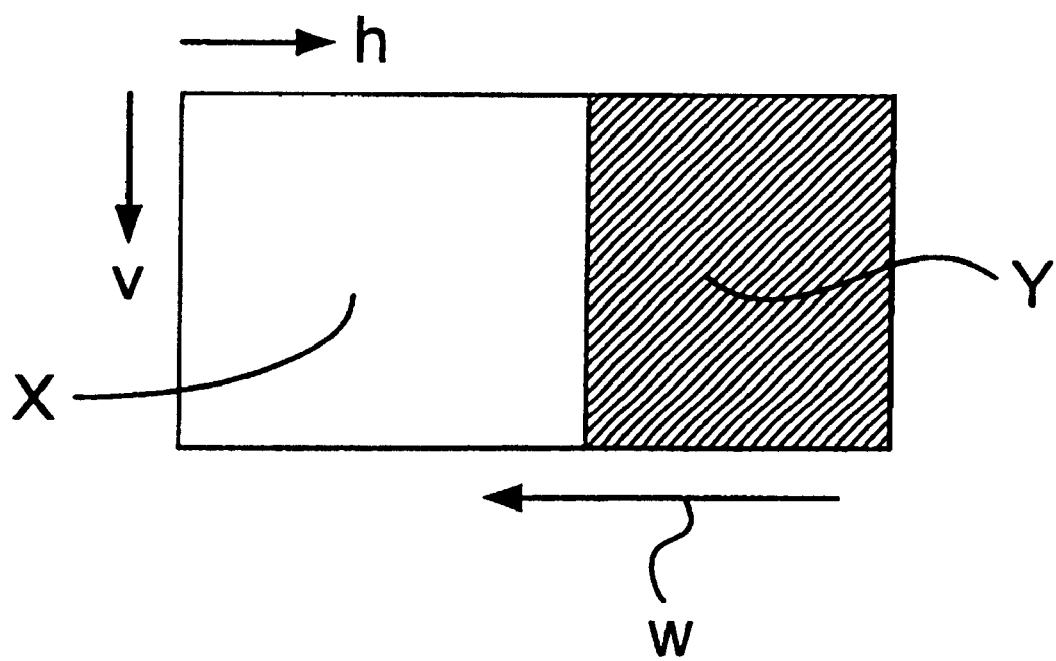
FIG. 1 illustrates a wipe.
Figure 2:
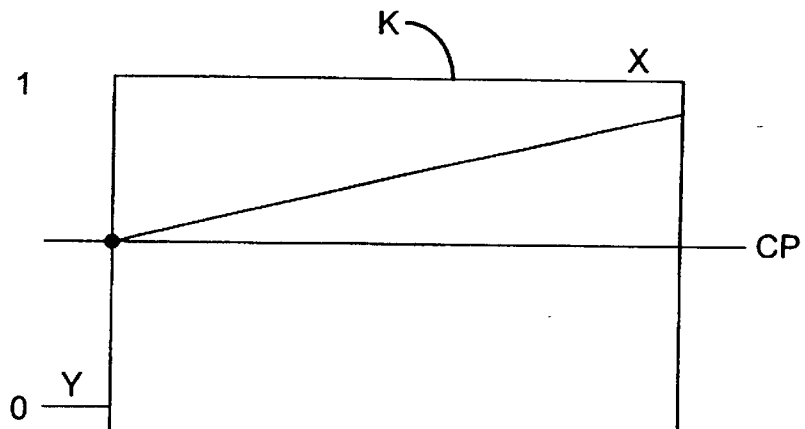
FIG. 2 illustrates a solid together with a key signal.
Figure 2:
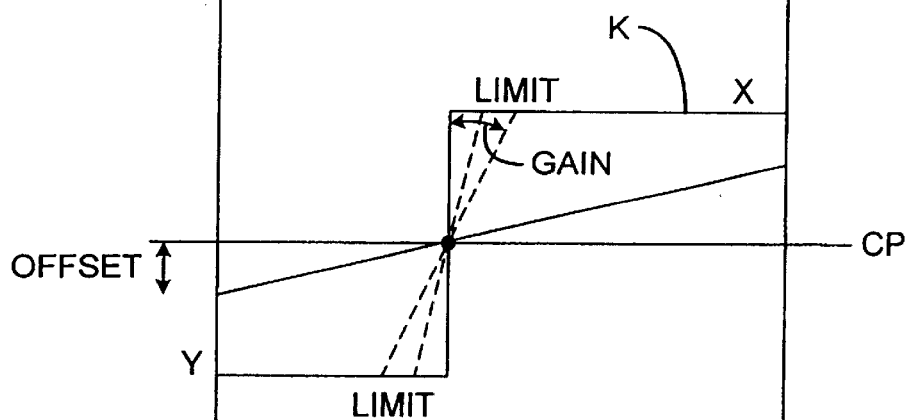
Figure 2:
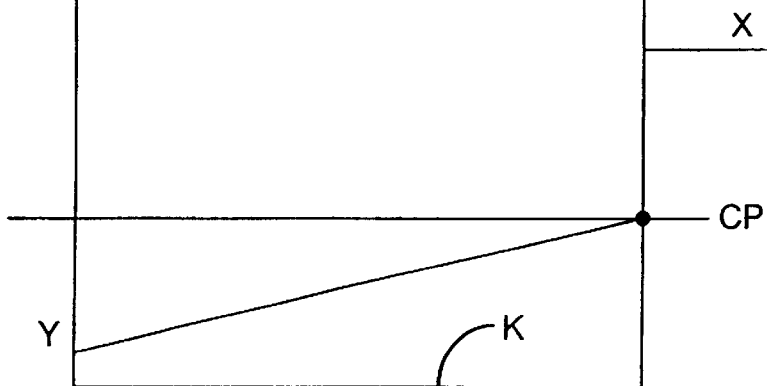

Input I10 is arranged to receive a solid from a solid generator external to the system of FIG. 1. Such a generator may be conventional and will not be further described.

Input I11 is connected to receive a solid from a basic ramp generator 12. An example of such ramp generator is described with reference to Annex A.

Input I12 is connected to an enhanced ramp generator 14. An example of such ramp generator is described with reference to Annex A. The generator 14 is connected to the rotary generator 16 which is connected to Input I13. y. An example of such a rotary generator is described with reference to Annex B.

Input I14 is connected to a Karaoke generator 18. An example of such a ramp generator is described with reference to Annex C.

The generators 12, 14 and 16 form a subsystem C1. An identical subsystem C2 is also provided, the generators of which are connected to inputs I15 to I17 corresponding to inputs I11 to I13 respectively.

Input I20 is connected to a Dust Mixer 26 an example of which is described in Annex D.

Input I18 is connected to a Random Generator 28 an example of which is described in Annex E.

Inputs I21 and I33 to I35 will be described hereinbelow.

Figure 3:
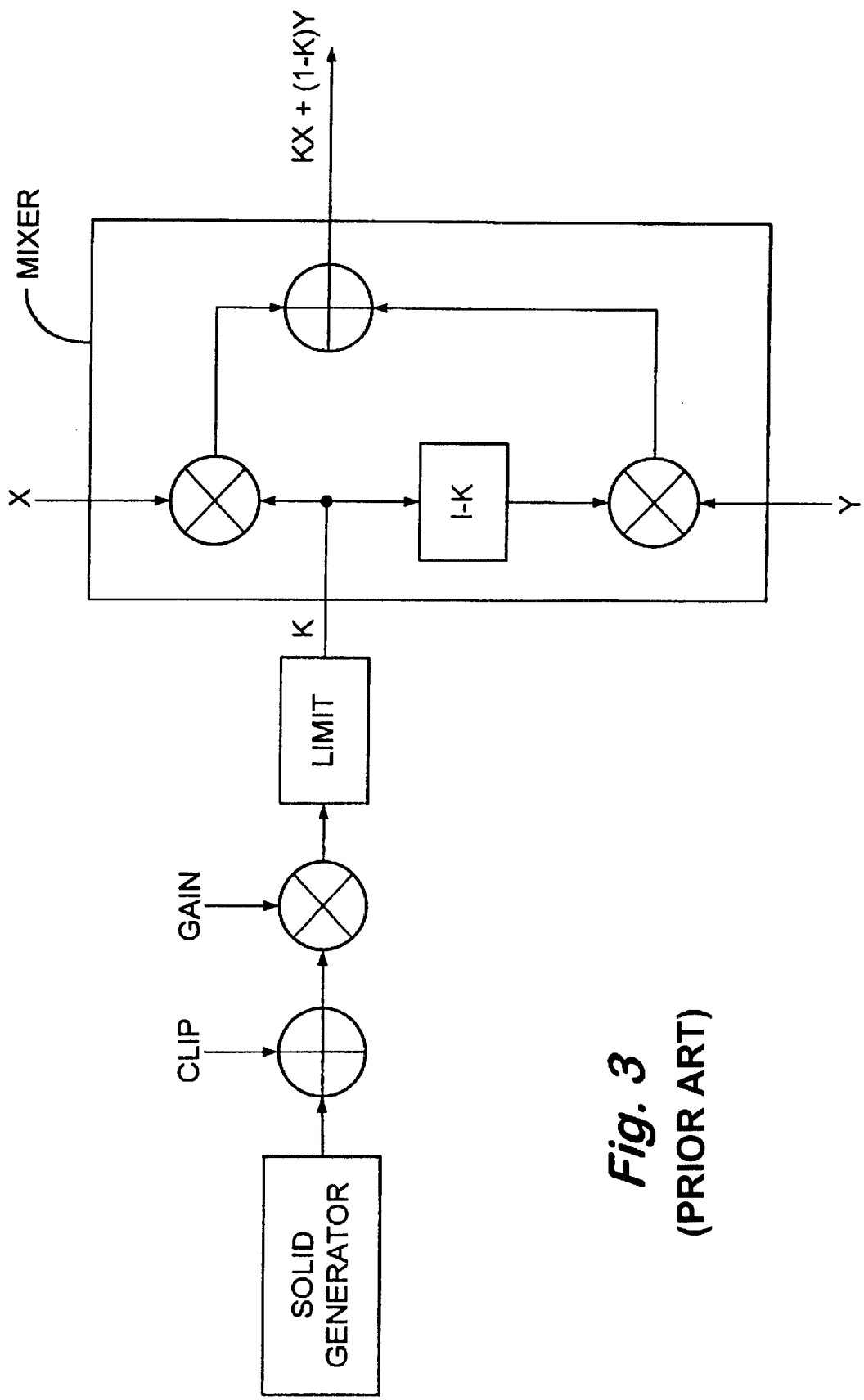
FIG. 3 is a schematic block diagram of a wipe generator.

Input I30 is connected to a first key generator 20. An example of a key generator is shown in FIG. 3 of this specification.

Figure 7:
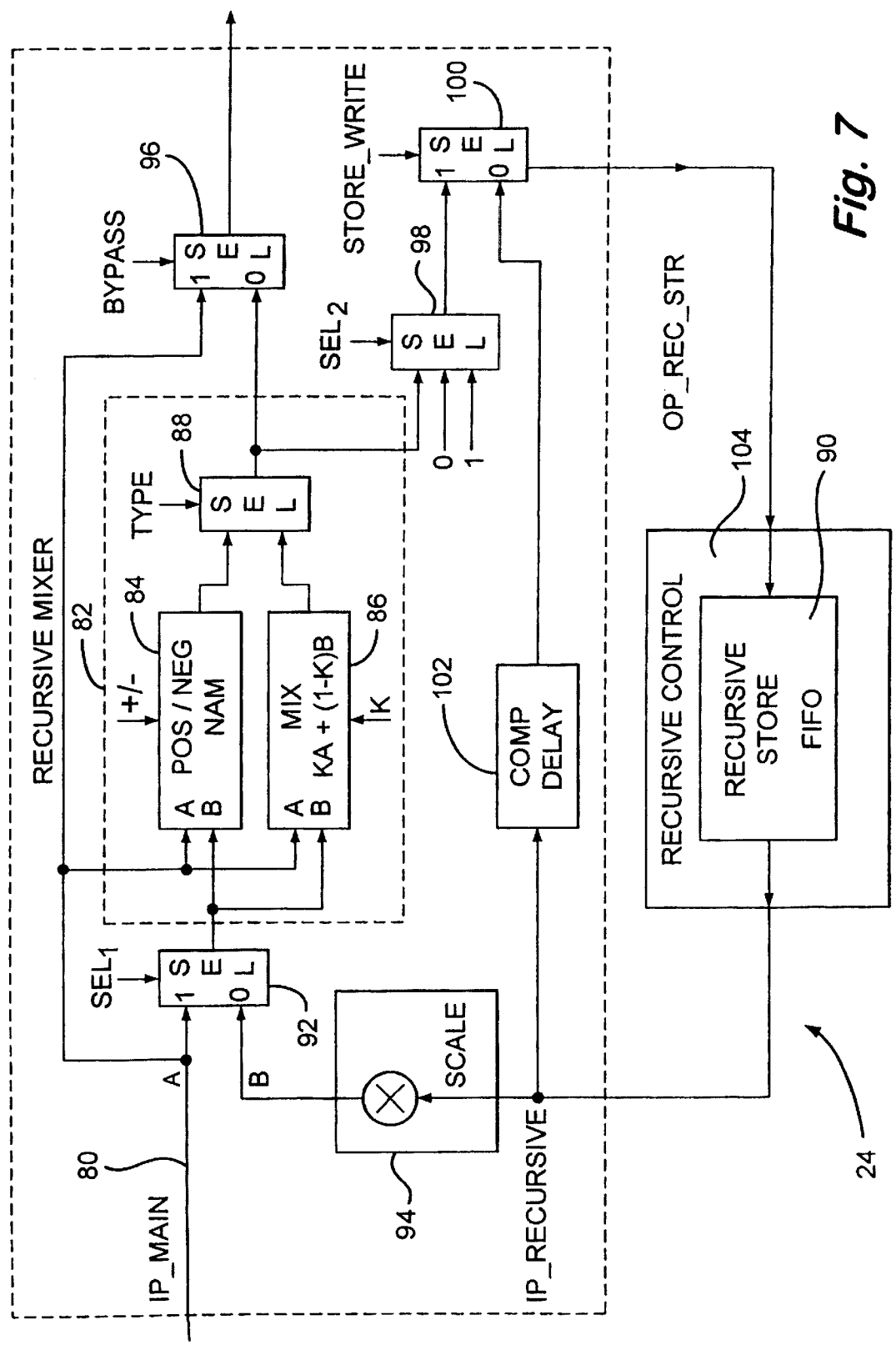
FIG. 7 is a block diagram of the recursive mixer of FIG. 4.

Input I31 is connected to a key mixer 22 an example of which is shown in FIG. 7 of this application.

Input I32 is connected to a recursive mixer 24 an example of which is shown in FIG. 7 of this specification.

Outputs

Outputs O10 and O11 are both connected to a pattern mixer 32. Examples of are described in Annex F and also with respect to block 82 of FIG. 7 of this specification or with reference to FIG. 10 of Annex A. Preferably two pattern mixers are provided. A first mixer mixes the solids at outputs O10 and O11. The second mixes the output of the first mixer and another solid for example the solid produced by the corresponding mixer of the subsystem B2 described below.:

Outputs O12 and O13 will be described hereinbelow.

Output O20 is connected to a second key generator 30 identical to the first key generator 20.

Output O21 is connected to the first key generator 20.

Outputs O22 and O23 will be described hereinbelow.

Outputs O30 to O33 are the final, main outputs of the system. Each can be connected to any of the inputs.

Subsystems

The key generators 20, 30, the key mixer 22 and the recursive mixer 24 form a second subsystem A1. An identical subsystem A2 is connected to inputs I33–I35 and outputs O22 and O23.

The pattern mixer 32 and dust mixer 26 form a third subsystem B1. An identical subsystem B2 is connected to input I21 and to outputs O12, O13.

The outputs O30 to O33 are connected to four output channels Z1 to Z4. It is possible to simultaneously output a total of 4 signals on the four channels Z1 to Z4 any of which may be a key signal produced by a key generator, a key mixer or a recursive mixer, or a solid produced by sub system C1, C2, B1, B2, the random generator 28 or the Karaoke generator 18.

The cross-point switch 10 is controlled by a timing and control processor 40, which defines the interconnection of the inputs and the outputs.

Delays 50 provide within the switch 10 a selection of preset delays to compensate for the variety of delays encountered by signals through the system, depending on the route they take through the system. For example, an external solid routed directly from input I10 to output O30 experiences a much shorter delay than a solid generated by the basic ramp generator 12 and routed through the pattern mixer 32 the dust mixer 26 the key generator 20 and the key mixer 22 to output O31. The delays 50 are controlled by the control 40 in accordance with the routing of the signals defined by control 40. The switch 10 is designed such that all signals experience the same delay regardless of the route through the system.

Subsystems B1 and B2

These subsystems are identical. Only subsystem B1 is described in detail.

Subsystem B1 comprises mixers 32 and 26. Pattern Mixer 32 allows solids produced by any of the generators of subsystems C1 and C2, and the Karaoke generator 18 and the pattern mixer of subsystem B2 to be mixed before application to the subsystems A1, A2 or to the outputs O30 to O33. Dust mixer 26 allows the output of the pattern mixer 32 to be combined with the output of the random generator before application to the subsystem A1, A2 or to the outputs O30 to O33.

Subsystems A1 and A2

These subsystems are identical and only A1 will be described. Subsystem A1 comprise the first and second key generators 20 and 30, key mixer 22 and the recursive mixer 24. Subsystem A1 allows a key signal to be generated by generator 20 and/or key generator 30. Each of the key generators 20, 30 also allows a solid to be passed to the key mixer. The key mixer 22 allows key signals or solids to be mixed. The recursive mixer allows keys delayed by a frame only to be mixed or allow solids delayed by a frame to be mixed as will be described in more detail with reference to FIG. 7. The first key generator is connected to input I30 of the system 10. The key mixer 22 has an output connected to input I31 of the system 10. The recursive mixer 24 has an output connected to input I32 of the switch 10.

Cross-Point Switch 10

Figure 5:
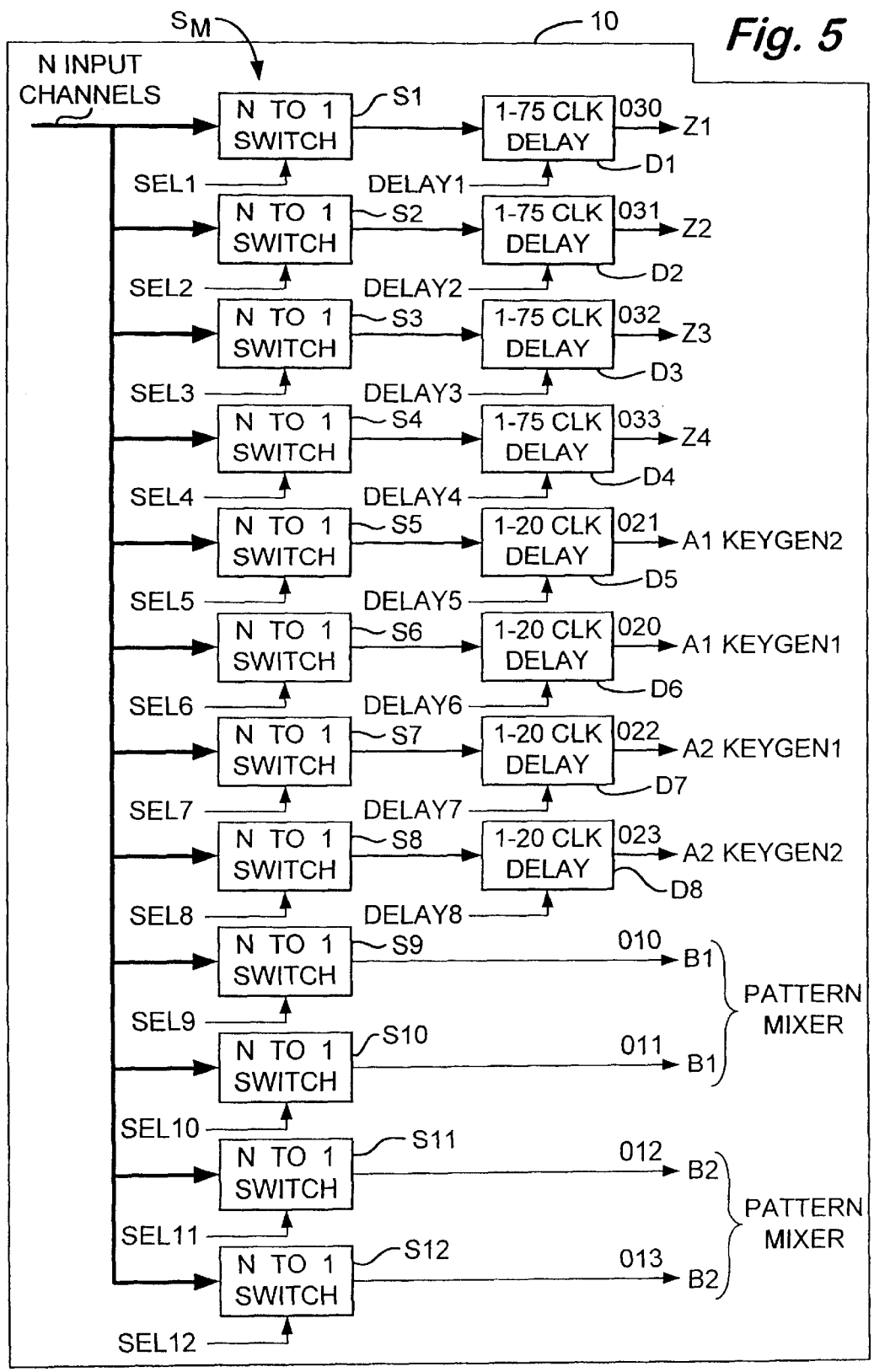
FIG. 5 is a schematic block diagram of an example of the cross-point switch of FIG. 4.

Referring to FIG. 5, the switch 10 has N input channels where N is for example 17, there being 17 inputs in FIG. 4. The switch of FIG. 5 has M outputs, where M in this example is 12.

Associated with respective ones of the M outputs are MN-to-1 switches $S_M$.

Each switch $S_M$ can connect any of the N input channels to its respective one of the M outputs.

Switches S1 to S4 are associated with the outputs O30 to O33 connected to the four output channels Z1 to Z4. The switches S1 to S4 are coupled to the outputs O30 to O33 via respective variable delays D1 to D4.

Switches S5 and S6 are associated with outputs O20 and O21 connected to the key generators 20 and 30 of subsystem A1. Switches S7 and S8 are associated with the outputs O22 and O23 connected to the key generators of subsystem A2. The switches S5 to S8 are coupled to the outputs O20 to O23 via respective variable delays D5 to D8.

Switches S9 to S12 are connected without delays to respective outputs O10 to O13 which are connected to the pattern mixers 32 of subsystems B1 and B2.

Delays D1 to D4 provide a delay in the range 1–75 clock periods and delays D5 to D8 provide a delay in the range 1–20 clock periods in the example of FIGS. 4 and 5.

The routing provided by each switch $S_M$ is controlled by a signal SELM and the delay provided by each delay is chosen corresponding to the route and is controlled by a signal DELAYM. Signals SEL M and DELAY M are produced by control 40.

Valid Routes and Corresponding Delays

By way of example, it is assumed that in the absence of any delays D1 to D8 the longest route through the generator has a delay of 75 clock periods greater than the shortest route. The delays D1 to D8 operate to ensure all routes impose the same delay.

Figure 6A:
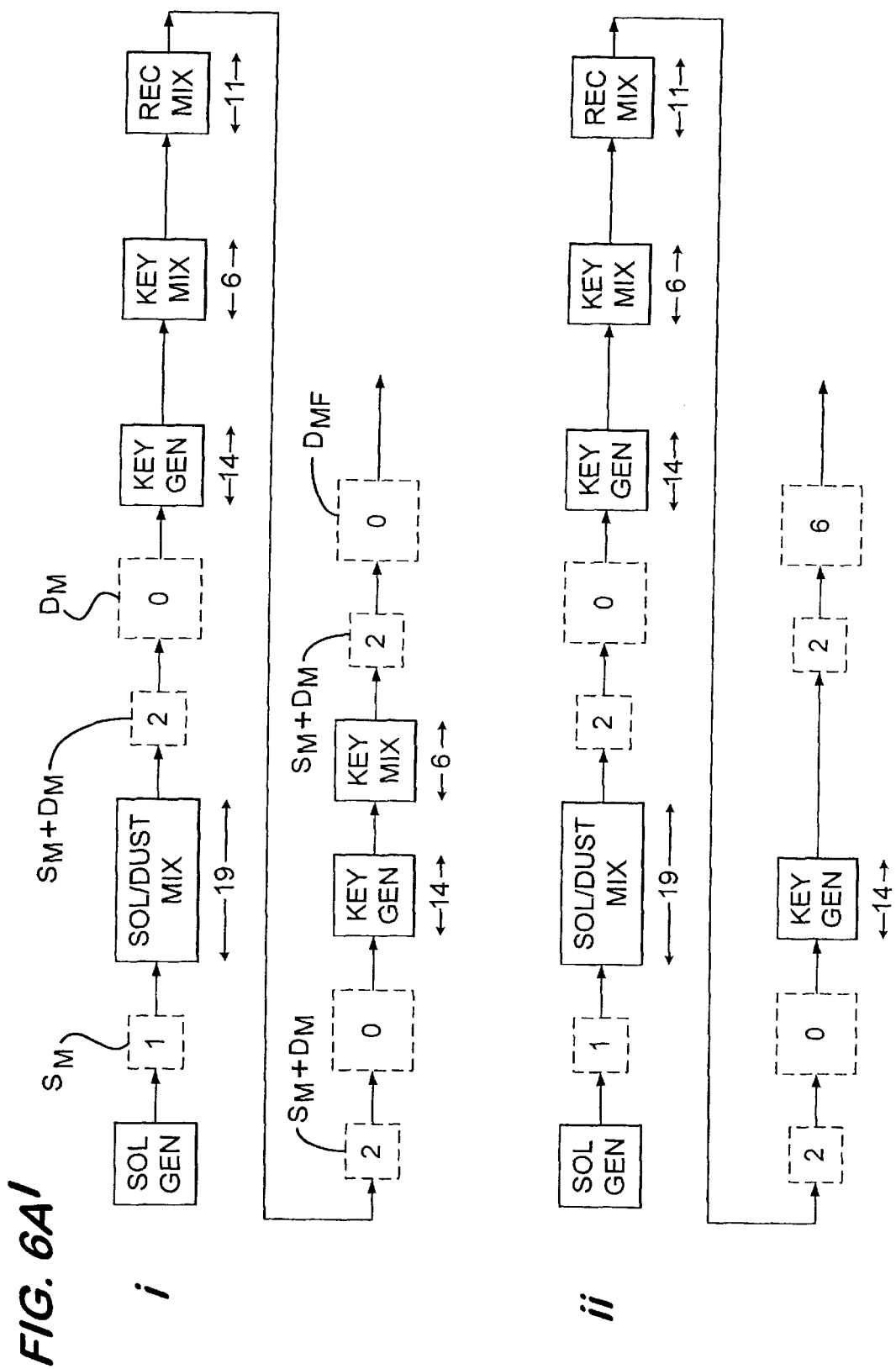
FIGS. 6A and 6B are flow diagrams showing valid signal routes through the generator of FIG. 4.
Figure 6A:
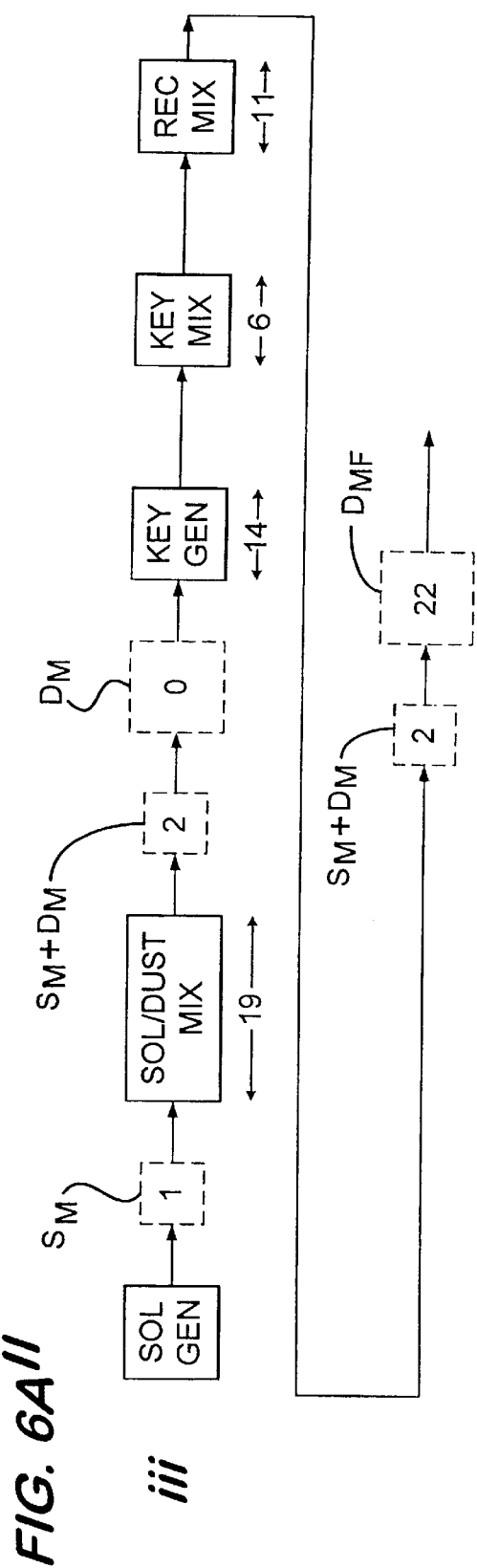
Figure 6A:
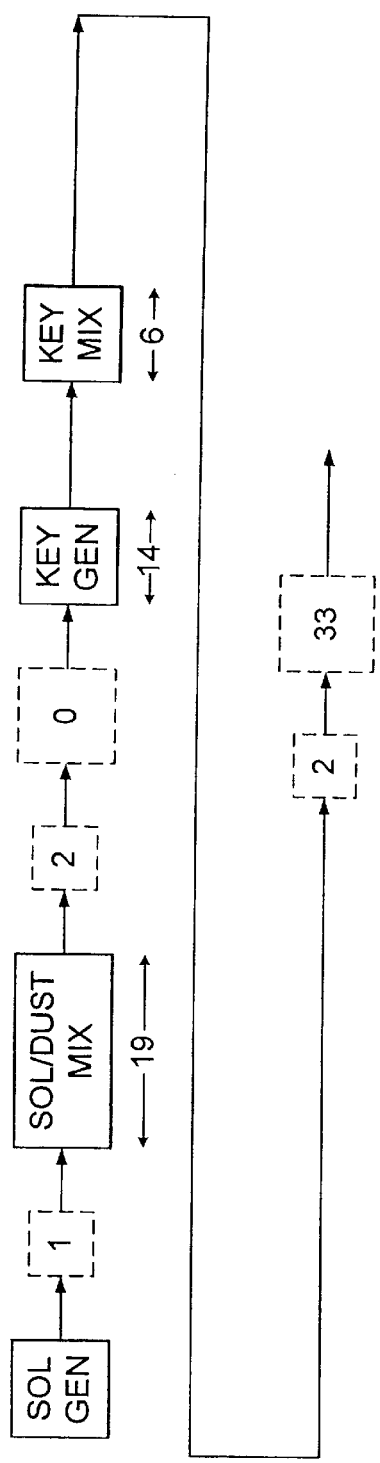
Figure 6B:
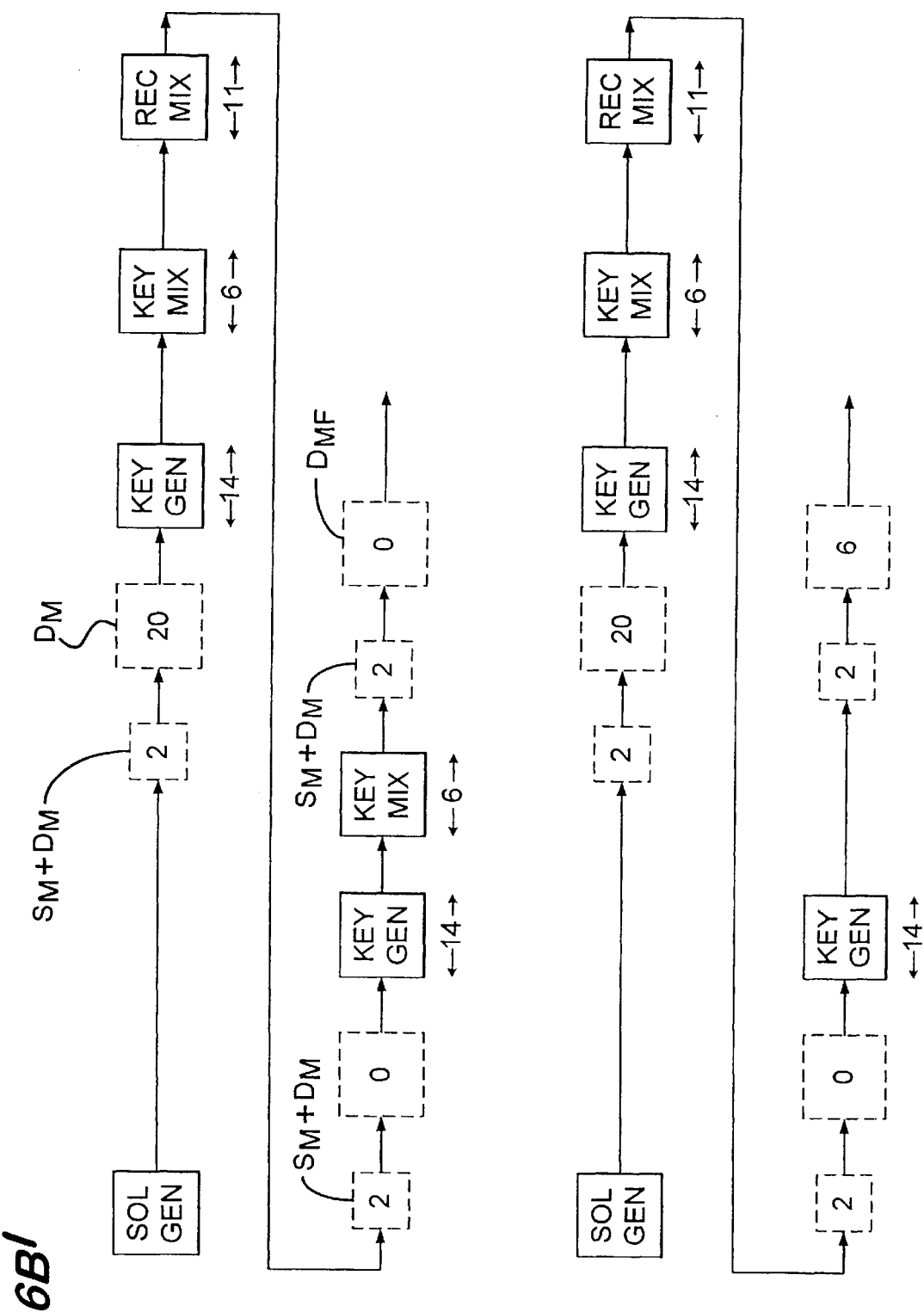
Figure 6B:
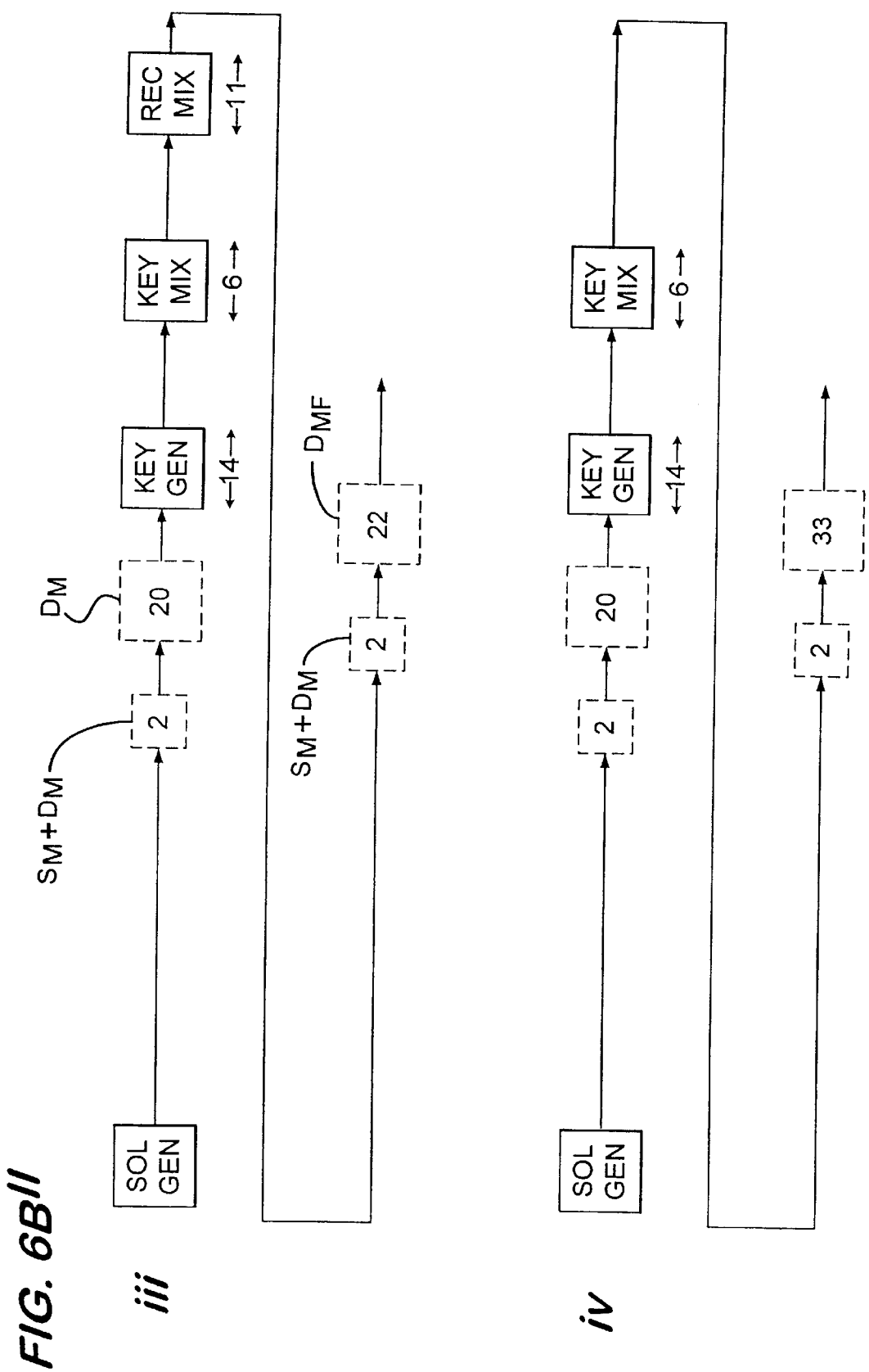

FIGS. 6A and 6B illustrate the delays of illustrative valid routes through the generator.

In FIGS. 6A and 6B:

"SOL GEN" is any of the generators 12, 14, 16, 18 of subsystems C1 and C2, and the random generator 28

"SOL/DUST MIX" is subsystem B1 or B2

"KEY GEN" is the first Key Generator (20) or the second key generator (30) of subsystem A1 or A2, "KEY MIX" is the key mixer 22 of subsystem A1 or A2, "REC MIX" is the recursive mixer 24 of subsystem A1 or A2.

In FIGS. 6A and 6B, each valid route allows only one pass through SOL/DUST MIX and only one pass through a recursive mixer. FIG. 6A shows routing including SOL/DUST MIX. FIG. 6B shows routes omitting SOL/DUST MIX.

Each Switch SM incurs a 1 clock delay. Each Delay DM incurs a minimum of 1 clock delay. These delays are shown in dashed boxes in FIG. 6. The delays of other elements are shown beneath the element in FIG. 6.

In FIG. 6Ai, a solid is generated, connected by one of the switches S9 to S12 to a subsystem B1 or B2 (1 delay) and then connected by one of switches S5 to S8 and its associated delay D5 to D8 (2 delays) to a subsystem A1 or A2 where it is subject to KEYGEN, KEY MIX, RECMIX.

The signal is then connected by another of the switches S5 to S8 and delays D5 to D8 (2 delays) to the other subsystem A1 or A2 where it is subject to KEYGEN and KEYMIX before being connected by one of the switches S1 to S4 and delays D1 to D4 (2 delays) to one of the outputs O30 to O33.

The delays through the route amount to 75+2=77 clocks, of which the final 2 are incurred through one of the switches S1 to S4 and one of the delays D1 to D4.

FIGS. 6Aii to 6Av show other progressively shorter routes.

FIG. 6Avi shows the shortest route involving SOL/DUST MIX which has a delay of 20+2=22 clocks. Thus a final delay DMF=55 clocks is provided.

In FIG. 6A, the delays of all routes are preset to be 75+2=77 clocks. Likewise, in FIG. 6B, the delays of all routes i to vi are preset to be 75+2=77 clocks.

In FIG. 6Bi the longest route is shown. A solid is routed through one of the switches S5 to S8 and one of the delays D5 to D8 which are set to provide 2+20=22 delays corresponding to the total delay of routing through a switch S9–S12, a SOL/DUST MIX, a switch S5–S8 and a delay D5 to D8.

The solid is then routed through one of the subsystems A1 and A2 and through another of the switches S5 to S8 and delays D5 to D8 to the other of the subsystems A1 and A2 before being routed via one of the switches S3 to S4 and delay D1 to D4. The final delay DMF set in one of the delay D1 to D4 is 0. The total delay is 2+75=77 clocks.

FIG. 6Bii to v show progressively shorter routes.

FIG. 6Bvi shows the shortest route in which a solid is routed via one of the switches S1 to S4 and delays D1 to D4 to one of the outputs O30 to O33. In this case the delay is set to be 2+75=77 clocks in the switch and final delay. Thus DMF is set at 75.

Other routes through the generator system are physically possible. However, the routes of FIGS. 6A and 6B are the currently preferred complete set of routes. Such a set of preset routes allows the necessary delays to also be preset simplifying control of the generator system.

Key mixer

The key mixer 22 is identical to the pattern mixer described with reference to FIG. 10 of Annex A.

The key mixer may mix signals supplied to it, or it may pass a signal unmixed.

Recursive Mixer 24 Referring to FIG. 7, the recursive mixer 24 has an input 80 which receives a solid or a key signal A from the key mixer 22. The received signal may thus be a single unmixed key signal from one of the key generator 20, 30; a mixed key signal from a mixing stage of the key mixer 22; an unmixed solid from the key mixer; or a mixed solid from the key mixer.

The recursive mixer comprises a mixing stage 82 comprising a Non Additive Mixer NAM 84, an additive mixer 86 and a selector 88 which selects the output of one of the NAM 84 and mixer 86 according to a selection signal TYPE. The NAM may be positive or negative according to a signal +/−.

The recursive mixer also comprises a FIFO frame store 90 which provides another key or solid signal B which is mixed in the mixing stage 82 with key or solid signal A. The store 90 has a store control 104.

The signal B is supplied from the store 90 to a selector 92 via a scaling circuit 94. Scaling circuit 94 applies a selectable gain G O≦G≦1 to the signal B.

Selector 92 is controlled by a selector signal SEL1. Selector 92 also receives signal A.

Signal A and the output of the mixing stage 82 are connected to the inputs '1' and '0' of a selector 96. If a selection signal BYPASS='1', then the signal A is routed directly to the output of the recursive mixer unchanged. If the signal BYPASS ='0' then the mixed output of the mixing stage 82 is directed to the output.

The output of the mixing stage 82 is supplied via selectors 98, 100 to the recursive store 90.

Selector 98 selects one of: a) the output of mixers stage 82; b) a preset value 0; and c) a preset value 1; according to a selector signal SEL2.

Selector 100 selects either the output of selector 98 or the output of the frame store 90 fed back via a compensating delay (comp.delay) 102.

The store 90 is FIFO and the delay 102 allows the continual recycling of the data stored therein. The delay 102 corresponds to the signal delay through the mixing stage 82 and 92, 94, 98 to maintain the correct time relationship between a frame of data stored in the FIFO and new frames of data provided to the mixing stage, even whilst the stored data is recycled.

Assume that a solid B from a previous frame has been stored in the store 90 and a new solid A from the current frame is on input A. The selector 92 is set by SEL1 to feed stored solid B to the mixing stage 82. The mixing stage mixes A and B by NAM mixing or additively mixing them as selected by selector 88 controlled by TYPE. The mixed solid may then be fed to the output via selector 96 and also fed via selectors 98 and 100 to the store 90. The process can be repeated building up a mix of many solids from different frames in the store 90.

The contents of the store 90 may be replaced by fixed values 1 or 0 using selector 98 to initialise the store contents. The contents of the store are initialised to all '0' or to all '1' depending on whether a NAM operation is positive (initialise to all '0') or negative (initialise to all '1').

Recursive mixing is known in the art and will not be further described.

Key signals may be mixed in the recursive mixer in the same way as solids. Mixed solids may be converted by a key generator into a key signal enabling a wipe to be performed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A system for generating solid signals for use in a vision mixer and key signals comprising:
   n solid signal generators, where n is equal to or greater than 2;
   m key signal generators where m is equal to or greater than 2;
   switching means having first inputs connected to respective ones of the solid generators to receive solid signals therefrom,
   second inputs coupled to respective ones of the key generators to receive key signals therefrom,
   first outputs connected to respective ones of the key generators for supplying solids thereto,
   and at least one second output; and
   control means for controlling the switching means;
   the control means and the switching means being arranged to:
   connect any of the first inputs to any of the first and second outputs; and
   connect any of the second inputs to the, or any, second output.

2. A system according to claim 1, wherein the n solid generators connected to the first inputs include a first plurality of ramp generators.

3. A system according to claim 2, wherein the n solid generators connected to the first inputs include a second plurality of ramp generators.

4. A system according to claim 1, wherein the n solid generators connected to the first inputs include a polar converter for converting linear ramp signals to polar form.

5. A system according to claim 1, wherein the n solid generators connected to the first inputs include ramp generator which produces a video ramp signal R for each pixel of a predetermined set of pixels h where h=0 to n of each of a predetermined set of video lines v where v=0 to m, wherein R=Ah+Bv+C where A, B, and C are coefficients each having a signed value.

6. A system according to claim 1, wherein the switching means has third outputs and at least one third input, and further comprising signal mixing means coupled to the third outputs and to the or each third input.

7. A system according to claim 6, wherein the signal mixing means includes a recursive mixer.

8. A system according to claim 7, wherein the signal mixing means includes at least one non-recursive mixer.

9. A system according to claim 1, having a subsystem comprising first and second key generators connected to first outputs of the switching means, a mixer connected to said first and second key generators for mixing signals and supplied to the mixer by said first and second key generators, recursive mixer connected to said mixer, said mixer and the recursive mixer being connected to respective ones of third aspects of the switching means.

10. A system according to claim 9, wherein the first and second key generators selectively convert solid signals to key signals for supply to said mixer and supply the solid signals to said mixer.

11. A system according to claim 9, wherein said mixer selectively mixes signals supplied thereto and passes signals unmixed.

12. A system according to claim 1, having a subsystem comprising a first mixer connected to third outputs of the switching means; and a second mixer having first input connected to the first mixer and a second input for receiving a solid signal, the second mixer having an output connected to a third input of the switching means.

13. A system according to claim 12, wherein the first and second mixers each selectively mix signals supplied thereto and pass signals unmixed.

14. A system according to claim 1, further comprising delay means for applying delays to solid signals and/or key signals routed by the switching means through the system.

15. A system according to claim 14, wherein the delay applied to a solid and/or key signal is dependent on the route through the system.

16. A system according to claim 14, wherein the control means defines a set of routes through the system, and controls the delay means such that all routes have the same delay.

17. A system according to claim 1 having an input for receiving a solid from a source external to the system.

\* \* \* \* \*